Oct. 28, 1969

R. P. INCHAUSTI 3,474,849

RAPID CRYSTALLIZATION OF LIQUID CHEMICAL
PARTICLES IN SPRAY FORM

Filed Oct. 7, 1966

INVENTOR.
ROBERTO PLA INCHAUSTI

BY John Cyril Malloy

ATTORNEY.

United States Patent Office 3,474,849
Patented Oct. 28, 1969

3,474,849
RAPID CRYSTALLIZATION OF LIQUID CHEMICAL PARTICLES IN SPRAY FORM
Roberto Pla Inchausti, Rocas 151, Jardines de Pedregal, Mexico City 20, Mexico
Filed Oct. 7, 1966, Ser. No. 585,084
Int. Cl. B01d 1/16
U.S. Cl. 159—4 2 Claims

ABSTRACT OF THE DISCLOSURE

An apparatus and process for rapid crystallization of a solution which includes ejecting a conical spray of the solution from a nozzel into a housing from a point adjacent an outlet port at the bottom of the housing upwardly towards an inlet port through which a vortex of incoming gas is caused to flow in circumposed relation about the spray to cause droplets to form which fall to the outlet port at the bottom; and a closed system for flowing the fall in a gaseous stream to a separator means where the particulate matter is removed and the gas is recirculated, being directed again to the inlet of the housing for use in the vortex.

The present invention relates to a method and apparatus to rapidly crystallize chemical products or food products in the form of particles of a spray in an air aspersion of vortex form circumposed about the spray.

In many cases it is highly desirable by crystallization methods to separate the solute rapidly from a solvent, and the present invention is of a method and apparatus or equipment to effectuate the same in an economical way without impairing the quality of the product in relation to other processes and apparatus and at an increased rate of production which requires a relatively short time or period for processing.

Thus, one of the objects of the invention is to provide an improved method and apparatus for the crystallization of chemical products or food products of a decreased time period for the said crystallization.

An additional object of the instant invention is to provide a method and apparatus for the crystallization of chemical products or food products with inexpensive apparatus.

It is also an object of the present method and apparatus to reduce the time and cost of production of crystalline chemicals or food products in relation to other procedures or processes to produce similar results in which the crystals formed do not adhere to one another.

It is a general object of this invention to provide a process and apparatus of solidifying or crystallizing a liquid chemical into particulate form which includes ejecting the chemical in an atomized spray of droplets in one direction in a chamber and simultaneously flowing a mass of air in vortex form circumposed about the spray and in a generally opposite direction to circumferentially cool the spray and crystallize the same entraining the crystallized particles in a stream through an outlet of the chamber and conducting the stream with the solidified or crystallized particles to a separator means and there separating the crystalline material from the stream for simultaneous collecting of the crystalline formed chemical and expelling the stream.

It is another object of this invention to provide an improved apparatus and process of the type generally described in the preceding paragraph and with improved refinements described more particularly and fully hereinafter for the purpose of providing an improved crystalline solute product recovered from a chemical solution.

In accordance with these and other objects which will become apparent hereinafter, the instant invention will

2 now be described with reference to the accompanying drawings in which the figure is a side elevation view to illustrate the relative relationship of the apparatus and the steps of the process now to be described.

Referring to the drawing, wherein the reference to characters there designated correspond to those used in the following discussion, and referring particularly to the right-hand side of the drawing, there is shown and designated by the numeral 1 a storage tank which is provided with a feed pipe which includes intermediate the length thereof a control valve 2 to regulate the volume of flow therethrough, which is preferably gravity fed. A blower 4 is also provided to supply a stream of air to an aspersing gun 3 including an ejection nozzle disposed on the axis of a cylindrical chamber defined by a housing 5 having a cone-shaped floor with an outlet port and a truncated cone-shaped roof having an inlet which will be described hereinafter. The nozzle of the gun 3 is disposed well within the cone-shape floor area adjacent the outlet of the chamber and is directed along the longitudinal axis of the chamber 5 toward the inlet 6. A conduit or pipe 7 is provided to connect the outlet at the vertex of the cone-shaped floor to a separator means 8 which in the embodiment shown is a cyclone separator which includes a conical receptacle with a discharge gate means 10. The separator means or cyclone is connected by means of a pipe 11 connected in the loft of the separator means to atmosphere by means of a pipe section 13 with the draft being caused by means of a suction pump 12'. Referring to the inlet port 6 of the chamber 5, it comprises a plurality of openings arranged symmetrically about the longitudinal axis of the housing 5, each being provided with a substantially tangentially arranged fin so that air drawn into the inlet will be imparted with a vortex type or whirling motion.

In operation, a chemical or solution of a solute to be crystallized is charged into the storage tank 1 and simultaneously ejected or sprayed through the gun 3 in a volume controlled by the valve 2 so as to be entrained by the air blown from the blower 4 and ejected into the incoming whirling vortex of cool air so that the spray from the gun intersects the vortex at about the vertex thereof along the axis of the housing 5 and at the confluence and along the outer surface of the cone-shaped spray so that the particles of the spray are cooled and precipitate as indicated along the walls of the housing falling downwardly to the outlet at the vertex of the cone-shaped floor. Thereafter, the said crystallized particles are entrained by the stream of cool incoming air through the pipe 7 to the separator means 8. In the embodiment shown, the separator means comprises the cyclone separator in which the air is swirled around with the particulate matter falling into the conical receptacle for collection and discharge through the gate 10 while the air is drawn by means of the pump 12' for ejection as indicated. It will be noted that the counter-current of incoming swirling air is adapted to cool and crystallize the particles of the spray and entrain the same to travel the recovered solute to the separator means with the air of the vortex comprising a stream of travel and while drying the crystals. It will be apparent to those skilled in the art that various temperature controls may be employed in carrying out the process of this invention and preferably the solvent to be atomized or sprayed into the chamber will be at a temperature elevated with respect to that of the incoming stream of air in vortex form. Also, in the preferred embodiment a vibrator means is provided to continuously during operation of the process joggle the chamber 5 vibrating the same to enhance the movement of the particulate matter through the outlet port.

The instant invention it will be found results in an especially good crystallization or solidification of a hot chemical product with a high solid concentration. Various types of solutions may be treated in accordance with the teaching of this patent and in the broad sense the word "solution" as used is intended to embrace flowable chemical products including certain mixtures. There results from the operation indicated by the arrowed lines in the main chamber 5 in the high velocity air ejected from the nozzle means intersecting with the incoming vortex of air, a highly agitated state which serves to maintain the finely divided state of the ejected particles with the counter-current of inlet air holding the crystals apart from one another so they do not stick to one another or to the walls of the housing 5 whereby the crystallization process is speeded and the particles do not adhere in an undesired adhering conglomerate mass.

While the instant invention has been shown and described herein in what is conceived to be a practical and preferred embodiment and process or method, it is recognized that departures may be made therefrom within the scope of the invention, which is therefor not to be limited to the details disclosed herein, but is to be accorded the full scope of the claims so as to embrace any and all equivalent apparatus and articles.

What is claimed is:

1. Apparatus for the rapid crystallization of a solution including: a main generally cylindrical housing having a crystallization chamber defined therein and having spaced inlet and outlet ports, said inlet port being above said outlet port and said outlet port being at the bottom of the housing, ejector nozzle means disposed opposite the inlet port and adjacent to and above the outlet port and arranged to eject a spray upwardly toward the inlet port, said inlet port including means to impart a swirling motion to relatively cold air passing into the chamber in vortex configuration about the upward line of flow from the ejector nozzle; pipe means to connect the said ejector nozzle means to a point exterior of the housing, said pipe means including a first and a second section in parallel, said first section being connected to a storage tank for a solution and said second section being connected to a source of high velocity gas; metering means to control the relative volume of solution and gas delivered by said pipe means, said sections merging and blending at said nozzle means; separator means included in said apparatus and having an upper end above the level of said outlet port of said housing and a lower end for separating particulate matter and air, and having an inlet port adjacent said upper end and a first outlet port adjacent said lower end and a second outlet port adjacent said upper end and spaced from said inlet port, said separator means comprising means to separate by gravity solid particulate matter entrained in a gas stream with the solid particulate matter passing through said first outlet and said gas passing through said second outlet with said stream swirling through said separator means between said inlet port and second outlet port; and a closed conduit system including pump means to connect in series the inlet of said housing, said main chamber, the outlet at the bottom of said housing below said nozzle means, and separator means to crystallize the solution ejected by said nozzle means into a stream caused by operation of said pump means, said conduit system including a length connecting the outlet at the bottom of said housing and the inlet port of said separator means; and vibrator means to continuously and cyclically move the housing to facilitate fall of the solute particles, said vibrator means being arranged around the cylindrical portion of the chamber intermediate the inlet and outlets.

2. The apparatus as set forth in claim 1 wherein a storage tank is connected to said first section to provide a source of solution and said storage tank is disposed above said ejector nozzle.

References Cited

UNITED STATES PATENTS

| | | |
|---|---|---|
| 915,303 | 3/1909 | Mecredy et al. |
| 1,985,987 | 1/1935 | Hall. |
| 2,005,238 | 6/1935 | Peebles. |
| 2,054,441 | 9/1936 | Peebles. |
| 2,317,479 | 4/1943 | Peebles et al. |
| 2,333,333 | 11/1943 | Peebles et al. |
| 2,413,420 | 12/1946 | Stephanoff. |
| 2,460,546 | 2/1949 | Stephanoff. |
| 2,800,463 | 7/1957 | Morrison. |
| 1,366,712 | 1/1921 | Brindle et al. |
| 2,363,281 | 11/1944 | Arnold. |

NORMAN YUDKOFF, Primary Examiner

U.S. Cl. X.R.

23—273